US 8,094,889 B2

(12) United States Patent
Perez Gonzalez et al.

(10) Patent No.: US 8,094,889 B2
(45) Date of Patent: Jan. 10, 2012

(54) PROCEDURE FOR VERIFYING THE INTEGRITY OF DOCUMENT

(76) Inventors: Fernando Perez Gonzalez, Vigo (ES); Alberto Malvido Garcia, Cangas de Morrazo (ES)

( * ) Notice: Subject to any disclaimer, the term of this patent is extended or adjusted under 35 U.S.C. 154(b) by 0 days.

(21) Appl. No.: 12/867,250

(22) PCT Filed: Feb. 18, 2009

(86) PCT No.: PCT/EP2009/001130
§ 371 (c)(1),
(2), (4) Date: Aug. 12, 2010

(87) PCT Pub. No.: WO2009/103496
PCT Pub. Date: Aug. 27, 2009

(65) Prior Publication Data
US 2010/0310132 A1    Dec. 9, 2010

(30) Foreign Application Priority Data

Feb. 20, 2008  (ES) .................................. 200800467

(51) Int. Cl.
*G06K 9/03* (2006.01)
(52) U.S. Cl. ......................... 382/112; 382/100; 382/254
(58) Field of Classification Search .................. 382/100, 382/112, 233, 254
See application file for complete search history.

(56) References Cited

U.S. PATENT DOCUMENTS

| | | | | |
|---|---|---|---|---|
| 5,418,855 A | * | 5/1995 | Liang et al. | .................... 713/179 |
| 6,621,916 B1 | * | 9/2003 | Smith et al. | .................... 382/112 |
| 6,636,614 B1 | * | 10/2003 | Koeppen et al. | .............. 382/100 |
| 7,114,750 B1 | * | 10/2006 | Alasia et al. | ..................... 283/72 |
| 7,853,792 B2 | * | 12/2010 | Cowburn | ...................... 713/176 |
| 2004/0078574 A1 | | 4/2004 | Noga | |

FOREIGN PATENT DOCUMENTS

EP    0676877    10/1995

OTHER PUBLICATIONS

Ching-Yng Lin et al. "A Robust Image Authentication Method Distinguishing JPEG Compression from Malicious Manipulation", IEEE Transactions on Circuits and Systems of Video Technology, vol. 11, No. 2, Feb. 2001.
Cordula Kessler. "International Search Report—PCT/EP2009/001130 & Written Opinion of the International Searching Authority", May 2009.

* cited by examiner

*Primary Examiner* — Stephen Koziol

(57) ABSTRACT

Procedure for verifying the integrity of documents which comprises a characterization of the original document to obtain a hash (508) and a stage of integrity verification, this stage comprising in turn, representing (601) the digital document to be verified in a matrix format; adapting (602) said document to a determined resolution in the characterization and correcting (603) the inclination, obtaining a corrected image (604); obtaining (605), the displacement produced between the contents in the original document and the document to be verified; obtaining (610) optimal displacement coordinates for each one of the regions of the corrected image; obtaining (611) one metric from the quantified coefficients of the corrected image and the corresponding ones in the original document; deciding (612) on the integrity of each region of the digitalized document using the previous metrics; and finally deciding (613) on the integrity of the document based on the results of the previous step.

16 Claims, 3 Drawing Sheets

Original digital document

Printed and scanned document

Original digital document     Printed and scanned document

Original digital document     Printed and scanned document

Original digital document     Printed and scanned document

Original digital document     Printed and scanned document

Documento digital original

PROCEDURE FOR VERIFYING THE INTEGRITY OF DOCUMENT

FIELD OF THE INVENTION

The present invention refers to the field of document security, more specifically to the field that provides mechanisms which enable to verify the integrity of printed documents. Particularly, it is herein described a new characterization procedure and a new procedure for verifying the integrity of documents, expressly thought to be combined with cryptographic or watermarking tools.

BACKGROUND OF THE INVENTION

The new procedure is valid for documents which are originally in a digital or printed format, whose integrity could be verified even when printing or digitalization operations are performed on the document, since they enable to recognize and avoid or correct distortions produced by these operations. Among the digitalization procedures we can include those made with scanners or digital cameras, such as for example web cams or cameras built in mobile phones.

The main application of the present invention is to avoid fraud and falsification of documents, allowing as well the issuance of telematic means of official documentation, which could be printed to be used in in-person procedures, since the present invention describes a procedure which enables to extend the protection of current digital signature systems to the printed form, since it enables, among other things, a printed document to be printed and later digitalized without breaking the security chain. The nature of the new procedures herein described provides an additional advantage to the intrinsic protection of the digital signature, namely the possibility to locate and indicate in the digitalized document all the alterations which have been performed on the original content. Other applications of the procedures herein described are to make the business processes of printed document management and treatment more efficient, since it enables to automatically verify that several copies of printed documents are the same or that a printed document is exactly the same as another digital document.

The object of providing mechanisms which enable to verify the authenticity and integrity of printed documents is very old, and several solutions have been proposed, some of them based on the current digital signature systems and others using watermarking techniques.

The current systems of digital signature provide a plausible solution to the problem of digital document authenticity and integrity verification. However, they cannot be applied in the field of printed documents. The digital signature systems basically consist in obtaining a summary of the document, called hash, which is basically its characterization, encrypt it with a signatory's private code and attaching it to the document, which becomes signed. The verification of the authenticity and integrity of the signed document is performed extracting the attached hash, decoding it with the signatory's public code, and comparing that decoded hash with the new hash calculated from the document to be verified, using the same algorithm used in the to signing stage. If both hashes match perfectly, the authenticity and integrity of the document have been verified, otherwise, either the document has not been signed by the owner of the public code used in the verification (not authentic document) or the content of the document has not been modified. The algorithms for obtaining the hash most widely used by digital signature systems are SHA-1 and MD5, and it is because of them that the current digital signature systems are not useful once the signed document has been printed, since if the original digital document and the digital document to be verified differ in only one bit, the hash of both documents will be completely different and the verification of authenticity and integrity will be negative, even if the content of the document has not been altered. Therefore, as the printing and digitalization processes produce a great variety of distortions, it is necessary to introduce new procedures for obtaining hash or for characterizing documents, and new verification procedures to be able to resist or overcome the distortions produced by the printing and digitalization processes.

In the patent documents EP 0676877 A2 and ES 2182670 there is proposed the use of character recognition means, called OCR, on an original document to be signed and the document to be verified, and the application of the conventional algorithms for obtaining the hash on the outlet of OCR. This solution would enable to protect only the content in the text format of the document, without protecting elements such as images, marks or tables, which are frequently used due to the insertion of logos, seals, handwritten signatures, etc. Besides, there exist two distinguishing aspects, on the one hand, depending on the degradation suffered by the printed document and on the quality of the OCR recognition means, the conversion can be frequently wrong, and on the other hand, this mechanism does not enable to locate and indicate the alterations made on the content of the document.

The international patent application WO 2006/104374 A1 refers to the problem of protecting content other than text, indicating as possible hash functions some determined functions based on the Wavelet transform described in scientific publications.

U.S. Pat. No. 6,834,344 B1 describes a mechanism for marking a digital image using watermarking techniques, so that its authenticity and integrity can be verified once it has been printed and digitalized. Among the procedures described in said patent, it is worth mentioning the one used in the Discrete Cosine Transform (DCT) for obtaining the image hash. The characterization procedure consists in dividing the image into square blocks of n×n pixels, applying the DCT transform to each block, quantifying said coefficients, obtaining a hash or summary of the image collecting only some few quantified coefficients, encrypting said hash and inserting the encrypted hash in the image. The procedure for verifying the authenticity and integrity consists in extracting and decoding the hash inserted in the previous stage, thus obtaining a new hash from the image to be verified, making the same division into blocks and collecting the same DCT quantified coefficients, and comparing both hash, so that the authenticity and integrity of the image is verified if the distance between both hash is small.

The mechanisms described enable to verify the authenticity and integrity withstanding only a small part of the printing and digitalization distortions, such as the change in the color map, being unfit for most of the distortions introduced. Therefore, in a practical industrial application the procedures described in U.S. Pat. No. 6,834,344 would detect as falsified or not authentic a great number of documents which are in fact authentic. Firstly, all digitalization causes displacements in the content of the digitalized document with respect to the original digital document, which are frequently of a considerably great magnitude.

Secondly, there are geometrical distortions, which produce changes in the geometry of the document content. Among them, it is worth mentioning the inclinations, changes in the dimensions of the digitalized document with respect to the original one due to the scanner sensor, positive and negative curvatures and expansions and compressions. The changes in the document dimensions, the curvatures and expansions and compressions cause that, even finding the correct location of the document content, the optimal correspondence between the blocks of the original document, and the blocks of the printed and digitalized document do not match with a homogeneous grid placed on the content of the document to be verified, as described in U.S. Pat. No. 6,834,344, but instead for each block it is necessary to perform a fine synchronization stage which calculates the optimal coordinates of each region in an environment of the calculated initial position.

Another important aspect is the noise introduced by the printing and digitalization processes, which causes great changes in the DCT coefficients of the digitalized document. The present invention can include an optional noise filtering stage using current methodologies in image processing: medium-band filters, low-pass filters, band-pass filters or high-pass filters.

The present invention will enable to verify the integrity of the document overcoming the aforementioned distortions. Moreover, the present invention allows a great resolution when detecting alterations inserted in the document, that is to say, it enables to detect subtle changes in the content. Additionally, the procedures described in this invention enable to locate and indicate the alterations suffered by the document, thus enabling to detect behavior patterns in falsifications, or proving that the integrity of the document remains intact, even when said document has suffered accidental degradations such as stains and small tearing. It is therefore necessary to perform a stage of coarse synchronization which compensates these distortions.

Therefore, the technical problem which is solved by the present invention is to allow the authentication of a document even having said document undergone previous printing operations and later digitalization. Specifically, it enables to correct the displacements in the content of the digitalized document with respect to the original document and to correct the geometrical distortions caused by the scanner sensors, such as inclinations, positive and negative curvatures, expansions or compressions.

Besides verifying the integrity of the document, even having produced on said document the aforementioned distortions, the present invention also enables to locate and indicate the alterations suffered by the document verified with a great detecting resolution.

DESCRIPTION OF THE INVENTION

The invention refers to a procedure for verifying the integrity of documents according to claim 1. Preferred embodiments of the procedure are defined in the depending claims.

In the procedure object of the present invention it is verified the integrity of a document to be verified with respect to an original document. It comprises a previous stage of characterization of the original document, which in turn comprises:
  if the original document is a printed document, obtaining an original digital document through digitalization;
  representing the original digital document in a matrix format;
  dividing the document in regions having an N×M pixel size;
  obtaining coefficients in the transform domain through applying to each one of the regions, a transform;
  quantifying said coefficients;
  selecting, for each region, already quantified coefficients;
  obtaining a hash of the original digital document from the selected coefficients for each region.

On the document to be verified, a stage of integrity verification is carried out, which in turn comprises:
  if the document to be verified is a printed document, obtaining a digital document to be verified through digitalization;
  representing the digital document to be verified in a matrix format;
  obtaining a corrected image, taking the following steps in any order:
    adapting said document in matrix format to the same resolution A×B determined to obtain the hash of the digital original document;
    correcting the inclination of said document in matrix format;
  obtaining, from the corrected image and the hash of the digital original document, some first coordinates of displacement to compensate the displacement produced between the location of the contents in the digital original document and the location of the contents in the digitalized document to be verified;
  obtaining some optimal coordinates of displacement for each one of the regions of the corrected image, using regions of N×M pixels obtained in the same way as in the characterization stage, taking the following steps for each region:
    selecting a region of the corrected image taking into account the displacements produced according to the previously obtained first coordinates of displacement;
    obtaining the coefficients in the transform domain by applying, to said selected region, the same transform used in the characterization stage of the original document,
    quantifying said coefficients;
    obtaining said optimal coordinates of displacement from the comparison of said quantified coefficient with the coefficients of the corresponding region of the hash;
  obtaining at least one metric from the quantified coefficients of the corrected image and the coefficients corresponding to this region in the original image extracted from the hash of the original document, taking into account the optimal displacement coordinates for each region of the corrected image;
  deciding on the integrity of each region of the digitalized document using at least one of the previously calculated metrics and comparing it with a determined threshold; and
  finally deciding on the integrity of the document based on the results of the previous step. Strictly speaking, only a document that does not contain any altered zone can be considered intact. However, there will be modifications which do not affect the "meaning" of the document, such as stains, which will be detected by the present invention.

The stages of adaptation of the document in matrix format to the determined A×B resolution can be performed by interpolation and/or decimation.

The division of the document in regions having an N×M pixels size can be performed in one of the following ways:
  based on two covered regular grids displaced one with respect to the other;
  based on only one grid;
  based on more than two covered grids;

Additionally, the characterization and verification stages can include a location stage in which a region of interest is selected to protect only those regions having content. Likewise, the characterization and verification stages can include a stage of normalization of the contents of the regions, performing said normalization at one of the following times:
  before applying the transform;
  after applying the transform.
The applied transform can be any of the followings:
  Discrete Cosine Transform (DCT);
  Wavelet Transform;
  Fourier transform.
The selection of coefficients of each region can be static, using the same coefficients for all the regions, or dynamic, depending said selection on the region content. In the latter case, the dynamic selection of the coefficients of each region can be made choosing those coefficients whose energy is higher than a specific value or else choosing a specific number n of coefficients with the higher energy.

Obtaining the first displacement coordinates and obtaining the optimal displacement coordinates can be achieved in one of the following ways:
  applying the two-dimensional Inverse Discrete Cosine Transform (IDCT);
  applying the DCT Transform to the regions of the corrected image.

Obtaining the first displacement coordinates and obtaining the optimal displacement coordinates can be achieved according to any of the following criteria:
  according to the criterion of Maximum verisimilitude between both sets of coefficients;
  using technical statistics;
  according to the criterion based on distances or similitude measurements between both sets of coefficients.

It is therefore possible to apply the maximal verisimilitude criterion, technical statistics or distances or similitude measurements between the coefficients (transform domain), or between the representation values in the space of the matrix representation of the document to be verified, and the calculated representation of the original document obtained through inverse transform (spatial domain).

Obtaining the optimal displacement coordinates can be achieved by an adaptive synchronization scheme which calculates the optimal coordinates of each region, by correcting the calculated optimal coordinates for previous regions, being said correction calculated according to the value and the evolution of the metrics obtained for said previous regions.

In the final decision as to the integrity of the document, it is possible to additionally indicate the regions of the document whose integrity has been denied.

The metrics used can be one of the following:
  mean square error;
  mean error;
  maximum error;
  minimum error;
  error energy;
  normalized error energy;
  maximum cross-correlation;
  maximum normalized cross-correlation;
  probability obtained according to the criterion of maximum verisimilitude.

The procedure can also comprise, in the stage previous to the characterization of the original document, a stage of filtering of the original digital document to eliminate noise effects of the printing and digitalization and/or to condition the signal.

BRIEF DESCRIPTION OF THE DRAWINGS

The following is a brief description of a series of drawings which will help understand the invention better expressly relating to an embodiment of said invention which is presented as a non-limiting example thereof.

DESCRIPTION OF A PREFERRED EMBODIMENT OF THE INVENTION

FIGS. 1 to 4 help understand the technical problem arising from the state of the art, specifically from the method claimed in U.S. Pat. No. 6,834,344 B1.

Figure 1:
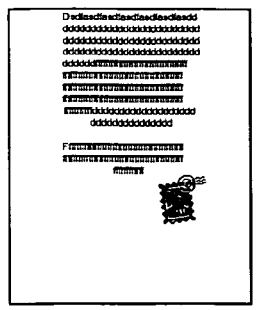
FIG. 1 shows an example of displacement between an original digital document and the same document after performing printing and digitalization operations.
Figure 1:
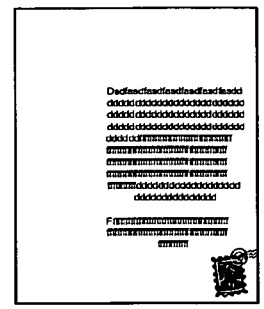
Figure 2:
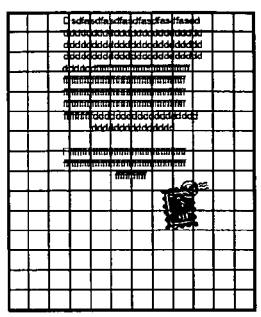
FIG. 2 shows a comparison between the quantified DCT coefficients of the divisions into blocks having a size of n×m pixels according to a state-of-the-art method, specifically using the method described in U.S. Pat. No. 6,834,344 B1.
Figure 2:
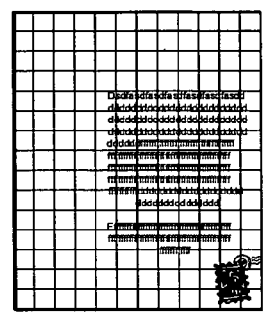
Figure 3:
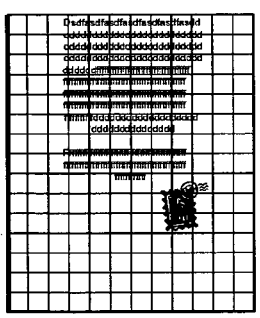
FIG. 3 shows an example of the geometrical distortions—specifically text/image inclinations—occurring in the printing and later scanning process.
Figure 3:
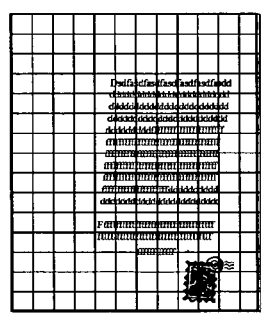

First, the digitalization of a document causes displacements in the content of the digitalized document with respect to the original document, which are frequently quite significant. FIG. 1 shows an example of displacement between an original digital document (image on the left) and the same document after performing printing and digitalization operations (image on the right). Using the method of U.S. Pat. No. 6,834,344 B1, we would have a comparison between the quantified DCT coefficients of the divisions into blocks having a size of n×n pixels shown in the documents in FIG. 2, which would produce a negative verification even when the content of the document has not been verified, since as it can be seen, different regions of the document would be compared.

Figure 4:
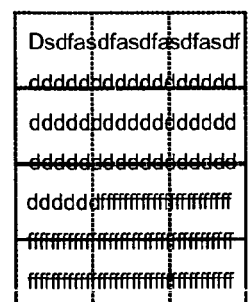
FIG. 4 shows an example of the optimal position of the blocks used to obtain the DCT coefficients in a digitalized document, where the optimal location of the regions is displaced with respect to a homogeneous grid.
Figure 4:

Secondly, there are geometrical distortions, which produce changes in the geometry of the content of the document. Among them it is worth mentioning the inclinations, like the one shown in FIG. 3, changes in the dimensions of the digitalized document with respect to the original due to the scanner sensor, positive and negative curvatures and expansions and compressions. FIG. 4 shows an example of the optimal position of the blocks used to obtain the DCT coefficients in a digitalized document, where, as it can be seen, the optimal location of the regions is displaced in certain occasions with respect to a homogeneous grid.

Figure 5:
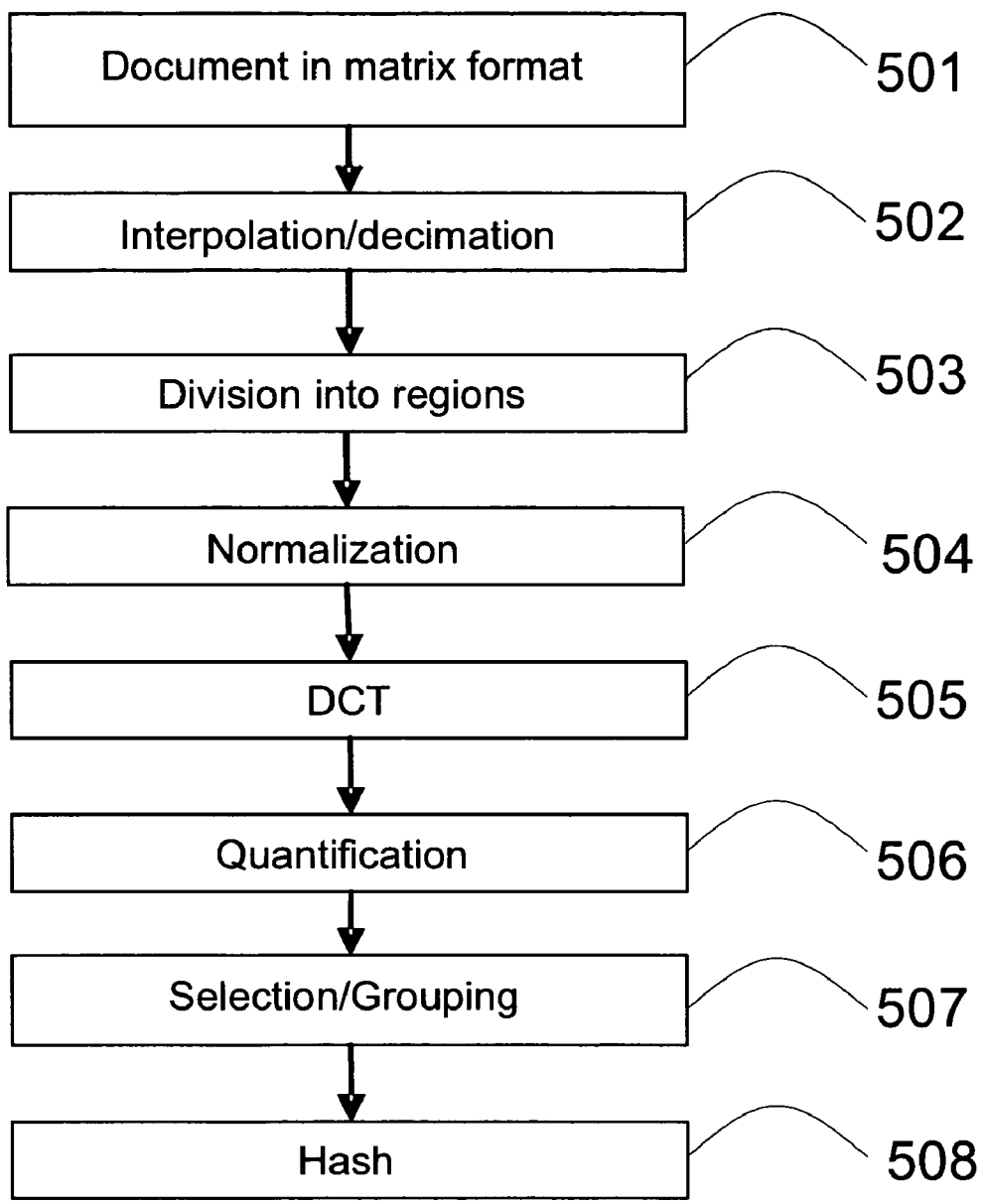
FIG. 5 shows a flow diagram of the characterization procedure used in the present invention.
Figure 6:
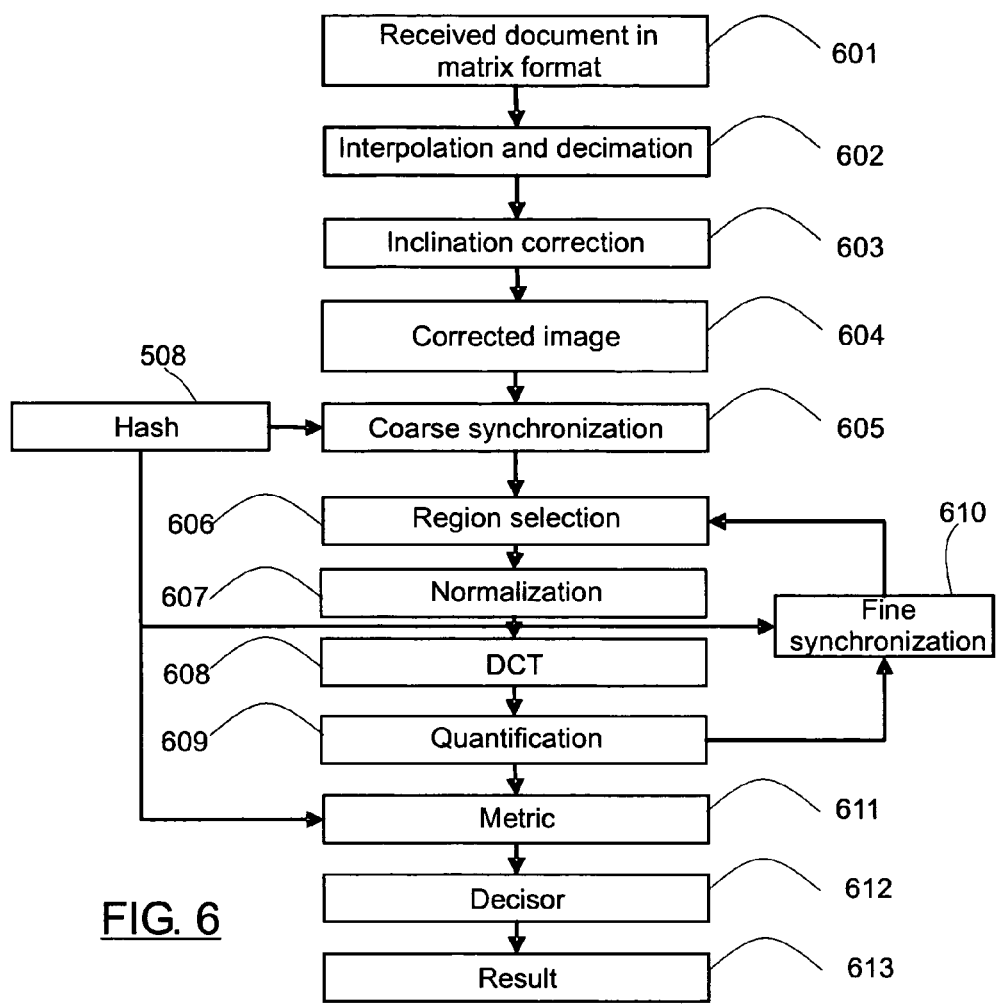
FIG. 6 shows a flow diagram of the integrity verification procedure used in the present invention.
Figure 7:
FIG. 7 shows a document divided into regions based on two regular covered grids, displaced one with respect to the other.

The present invention itself is described in FIGS. 5 to 7. The characterization to procedure is describes in FIG. 5 and the integrity verification procedure is shown in FIG. 6.

The characterization procedure shown in FIG. 5 results in an advanced summary of the digital document, which we will call hash 508, which will characterize the document. The characterization procedure stems from the representation in matrix format 501 thereof, with each value of the matrix representing the luminescence of the corresponding pixel. If the representation is performed in color, the document in matrix format 501 will have one more dimension, whose range will correspond with the number of colors used to represent the pixel value in the color space chosen. For example, if RGB representation is used, the matrix will be three-dimensional, with the third dimension coordinate possibly having one of three different values, one for red, one for green and one for blue.

On the document with the matrix format 501 decimation and interpolation operations 502 are performed to obtain an image with the desired resolution, from which the hash can be obtained. The document is later divided into regions 503 having a size of N×M pixels, based on two regular grids covered and displaced one with respect to the other, as it can be seen in FIG. 7. This covering in the processed areas of the document gives robustness and definition to the integrity verification procedure. In the present description we refer to 16×16 pixel regular regions. The content of the regions are normalized 504 to compensate part of the luminescence and color distortions produced by the printing and digitalization processes. There are known multiple normalization schemes which can be used. In this description we will use energy normalization. It is also worth mentioning that the normalization can be made in the spatial domain, that is to say, before applying the DCT transform 505, as it was described before, or in the frequency domain, after applying the DCT transform 505 with the same result. Next, the DCT transform 505 is applied to each one of the regions, obtaining the coefficients in the transform domain. Since these coefficients have to be saved or transmitted, they are quantified 506. There are numerous quantification mechanisms that can be used, such as fixed quantifiers, 2's complement and 1's complement, or floating quantifiers. In the present description we will refer to the representation in 2's complement with 20 bits. For each region certain DCT coefficients are saved, through grouping or selection of the DCT coefficients 507. The DCT coefficients thus grouped or selected in each block constitute the hash 508 of the document.

Selecting which DCT coefficients are used to constitute part of the hash is a very important aspect. On the one hand, a significant number of coefficients have to be saved so that a decision can be made which is not extremely affected by the impulse noise of printing and digitalization. On the other hand, it is necessary to save those coefficients which allow verification with the most guarantees possible, that is to say, those coefficients which are least affected by the distortions of the printing and digitalization processes, and which also contain information which is as representative as possible of the region from which they have been calculated. The most suitable coefficients are the ones with low and medium frequency, due to the fact that, on the one hand, they resist better the digitalization distortions, and on the other hand, they are the coefficients containing the most information, which makes the signal-noise relation after the printing and digitalization bigger in these coefficients than in those with high frequency. It is possible to choose static coefficients, that is to say, always using the same coefficients for all the regions, or make a selection according to the content of the region in question, mainly in the transform domain. An example of this last alternative is choosing, for each region, those coefficients having the most energy, so that the highest possible signal-to-noise relation is guaranteed in the verification stage, thus minimizing the effects of noise and improving the detection. In the present description we will assume dynamic coefficients, of 8 coefficients per region, which coincide with those 8 coefficients with the most energy. The collection of the quantified coefficients and the indexes of these coefficients form the hash 508.

The hash 508 is the element characterizing the document, and it will be used in the verification of the integrity of said document. The mechanisms used to associate the hash to the document and to the owner are not within the scope of this invention. A possible scenario would be to use the public code infrastructure, using this hash 508 to sign the document, and inserting this digital signature in the document in the form of a two-dimensional bar code. If the original format of the document is digital, this bar code would be inserted therein. By contrast, if the original format is printed, the bar code would be printed directly on the document.

The new verification procedure, described in FIG. 6, enables to verify the integrity of the previously characterized document, once it has been digitalized, being also possible to locate those regions which have been altered. To that end representation in matrix format 601 of the digitalized document and the hash 508 of the original documents are used.

In the first place, there are performed operations of interpolation and decimation 602, to obtain a matrix representation whose resolution coincides with the one used during the hash obtaining stage, as well as a correction of the inclination 603, to correct possible distortions of the document digitalization stage. The order of these two sates is interchangeable. Correcting the inclination requires an inclination angle calculation stage, and a stage of correcting said inclination. There are different mechanisms to detect the inclination angle. On the one hand, if a bar code has been inserted in the document, the inclination angle can be found from a section of the image containing the bar code. In order to do that, this part of the image has to be made binary, morphological operations have to be made on them (dilations, erosions, openings and closing), and then the inclination would be detected based on the relative position of the corners using trigonometric techniques. On the other hand, it would be possible to use the methods described in the scientific literature, which mainly use Hough Transform. Once the inclination angle is calculated, the image is rotated using a geometrical transformation and interpolation. In this way, a corrected image 604 is obtained.

Later, a coarse synchronization 605 is carried out, which is necessary to compensate the big displacements which could have been produced between the location of the contents in the original document and the location of the contents in the document to be verified, mainly due to the digitalization. In order to perform the coarse synchronization the corrected image 604 and the hash 508 of the original document have to be used. As coarse synchronization algorithms it is possible to use some of the synchronization algorithms used in the communication systems both in the spatial domain, using the two-dimensional Inverse Discrete Cosine Transform IDCT to the coefficients of the original hash 508, and in the transform domain, applying the DCT transform to the regions of the corrected image 604. Some examples include:

applying the DCT transform of one or several regions of the matrix representation of the corrected image 604 in an environment of possible coordinates, and calculating the quantified coefficients using the same procedure used for obtaining the hash 508 of the original document, and choosing the coordinates according to the maximum verisimilitude criterion, that is to say, choosing those coordinates which maximize the probability of obtaining quantified coefficients of the corrected image, assuming that the coefficients of the original hash 508 have been extracted from the original document.

applying the abovementioned criterion separately to one or several regions of the received document, and obtaining the global coordinates from the coordinates calculated for each region, using statistic techniques, such as the most likely value or the mean value.

synchronization based on criteria of distance or similitude measures between both sets of coefficients, such as maximum cross-correlation or normalized cross-correlation, norm minimization between both sets of coefficients, hamming distance minimization, Mahalanobis distance minimization, mean error minimization, mean square error minimization or alike.

Later, the integrity verification of each one of the regions of the corrected image 604 is performed, using regions having the same size as in the hash 508 obtaining stage. In this particular case, 16×16 pixels regions were used. As it was stated before, due to the geometrical distortions of the printing and digitalization processes, the position of the regions does not correspond to the ones of a 16×16 uniform grid laid on the corrected image based on the coordinates calculated in the coarse synchronization procedure. In order to perform a successful verification, a fine synchronization module 610 is used for each region of the corrected image 604, to calculate the optimal coordinates. As fine synchronization schemes it is possible to use the same ones described for the coarse synchronization or it is possible to implement a phase-locked loop (PLL) structure, which will perform the acquisition and follow-up of the optimal synchronization coordinates in a way analogous to the current communication systems.

As it has been described before, due to the distortions and the noise introduced by the printing and digitalization processes, the integrity verification will be highly inefficient if it is decided based on a perfect matching between the DCT coefficients and therefore it is best to use alternative deciding methods. The deciding method shall be based on comparing one or several metrics with a threshold. The metrics are obtained from the quantified coefficients of the corrected image 604 and the ones corresponding to this region in the original image, extracted from the hash 508.

Some of the metrics that may be used are the following:
Mean square error.
Mean error;
Maximum error;
Minimum error;
Error energy;
Normalized error energy;
Maximum cross-correlation;
Maximum normalized cross-correlation;
Probability obtained according to the criterion of maximum verisimilitude, assuming that the channel consisting of the printing and digitalization procedures is additive, multiplicative, or that it follows some of the models described in the scientific literature.

The decision making element 612 will verify the integrity of each region of the document using the previously calculated metrics 611. If the similitude value or the probability value is bigger than a given threshold, the integrity of the region has been verified, and if not, it is assumed that the region has been altered or does not correspond to the region of the original document to which it is being compared, and is indicated for a visual verification of the content alteration detected. Another scenario is that in which the decision 612 is made through a joint evaluation, using several or all the calculated metrics 611.

Once the decision has been made about all the regions of the document, the result 613 is obtained, which shall indicate whether the integrity of the document has been confirmed or not. If what is described is part of a digital signature system, the confirmation of the integrity leads to the confirmation of authenticity. Since the verification is carried out by regions, it is possible to exactly locate which areas of the document have been altered, thus enabling to indicate which areas they are in the document to be verified.

The invention claimed is:

1. A procedure for verifying the integrity of documents, in which the integrity of a document to be verified is verified with respect to an original document, characterized in that it comprises a previous characterization stage of the original document, which in turn comprises:
    in case the original document is a printed document, obtaining an original digital document through digitalization;
    representing the original digital document in a matrix format;
    adapting the document in matrix format to a determined A×B resolution;
    dividing the document into regions having an N×M pixels size;
    obtaining coefficients in the transform domain through applying to each one of the regions, a transform;
    quantifying said coefficients;
    selecting, for each region, already quantified coefficients;
    obtaining a hash of the original digital document from the selected coefficients for each region;
and characterized in that on the document to be verified, a stage of integrity verification is carried out, which in turn comprises:
    in case the document to be verified is a printed document, obtaining a digital document to be verified through digitalization;
    representing the digital document to be verified in a matrix format;
    obtaining a corrected image, taking the following steps in any order:
        adapting said document in matrix format to the same resolution A×B determined to obtain the hash of the digital original document;
        correcting the inclination of said document in matrix format;
    obtaining, from the corrected image and the hash of the digital original document, some first displacement coordinates to compensate the displacement produced between the location of the contents in the original digital document and the location of the contents in the digitalized document to be verified;
    obtaining some optimal displacement coordinates for each one of the regions of the corrected image, using regions of N×M pixels obtained in the same way as in the characterization stage, taking the following steps for each region:
        selecting a region of the corrected image taking into account the displacements produced according to the previously obtained first coordinates of displacement;
        obtaining the coefficients in the transform domain by applying, to said selected region, the same transform used in the characterization stage of the original document,
        quantifying said coefficients;
        obtaining said optimal coordinates of displacement from the comparison of said quantified coefficient with the coefficients of the corresponding region of the hash;
    obtaining at least one metric from the quantified coefficients of the corrected image and the coefficients corresponding to this region in the original image extracted from the hash of the original document, taking into account the optimal displacement coordinates for each region of the corrected image;

deciding on the integrity of each region of the digitalized document using at least one of the previously calculated metrics and comparing it with a determined threshold; and deciding on the integrity of the document based on the results of the previous step.

2. A procedure according to claim 1, characterized in that the adaptation stages of the document in matrix format to the determined A×B resolution is performed through interpolation or decimation.

3. A procedure according to claim 1, characterized in that the division of the document into regions having an N×M pixels size is performed in one of the following ways:
- based on two covered regular grids displaced one with respect to the other;
- based on only one grid;
- based on more than two covered grids.

4. A procedure according to claim 1, characterized in that additionally the characterization and verification stages include a location stage in which a region of interest is selected to protect only those regions having content.

5. A procedure according to claim 1, characterized in that additionally the characterization and verification stages include a stage of normalization of the contents of the regions, performing said normalization at one of the following times:
- before applying the transform;
- after applying the transform.

6. A procedure according to claim 1, characterized in that the applied transform can be any of the followings:
- Discrete Cosine Transform DCT;
- Wavelet Transform;
- Fourier transform.

7. A procedure according to claim 1, characterized in that the selection of coefficients of each region is static, using the same coefficients for all the regions.

8. A procedure according to claim 1, characterized in that the selection of coefficients of each region is dynamic, depending said selection on the region content.

9. A procedure according to claim 8, characterized in that the dynamic selection of the coefficients of each region is made choosing those coefficients whose energy is higher than a specific value.

10. A procedure according to claim 8, characterized in that the dynamic selection of the coefficients of each region is made choosing a specific number n of coefficients with the higher energy.

11. A procedure according to claim 1, characterized in that the obtaining of the first displacement coordinates and the obtaining of the optimal displacement coordinates are achieved in one of the following ways:
- applying the two-dimensional Inverse Discrete Cosine Transform IDCT to the coefficients of the original hash;
- applying the DCT Transform to the regions of the corrected image.

12. A procedure according to claim 1, characterized in that the obtaining of the first displacement coordinates and the obtaining of the optimal displacement coordinates are performed according to one of the following criteria:
- according to the criterion of maximum verisimilitude between both sets of coefficients;
- using technical statistics;
- according to the criterion based on distances or similitude measurements between both sets of coefficients.

13. A procedure according to claim 1, characterized in that the obtaining of the optimal displacement coordinates is achieved by an adaptive synchronization scheme which calculates the optimal coordinates of each region, by correcting the calculated optimal coordinates for previous regions, being said correction calculated according to the value and the evolution of the metrics obtained for said previous regions.

14. A procedure according to claim 1, characterized in that in the final decision about the integrity of the document it is additionally indicated the regions of the document whose integrity has been denied.

15. A procedure according to claim 1, characterized in that the metric used is one of the following:
- mean square error;
- mean error;
- maximum error;
- minimum error;
- error energy;
- normalized error energy;
- maximum cross-correlation;
- maximum normalized cross-correlation;
- probability obtained according to the criterion of maximum verisimilitude.

16. A procedure according to claim 1, characterized in that it comprises, in the stage previous to the characterization of the original document, a stage of filtering of the original digital document to eliminate noise effects of the printing and digitalization or to condition the signal.

* * * * *